F. WESSELS, Jr.
GLASS ROOF.
APPLICATION FILED MAR. 19, 1909.
937,667.
Patented Oct. 19, 1909.
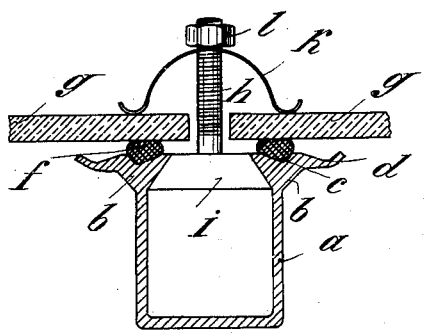
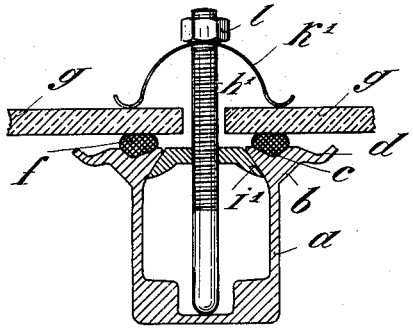
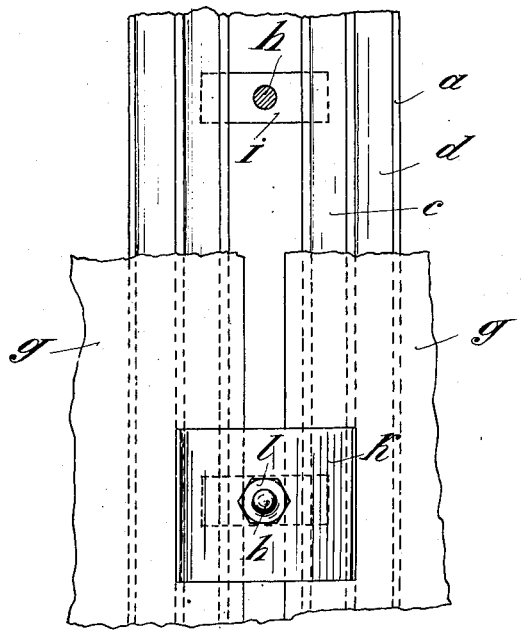
Witnesses:
Inventor:

UNITED STATES PATENT OFFICE.

FRANZ WESSELS, JR., OF DUSSELDORF, GERMANY.

GLASS ROOF.

937,667. Specification of Letters Patent. Patented Oct. 19, 1909.

Application filed March 19, 1909. Serial No. 484,461.

*To all whom it may concern:*

Be it known that I, FRANZ WESSELS, Jr., a subject of the German Emperor, residing at Dusseldorf, in the Empire of Germany, have invented a new and useful Improvement in Glass Roofs, of which the following is a specification.

The object of my invention is to provide a reliable glazing bar and fastenings for glass roofs, and I attain this object by forming a U-shaped rolled bar with internal and external top flanges so designed as to be rolled in one operation and to form combined packing grooves and drip channels at the top of the bar in close proximity to the glass panes of the roof, said panes being secured by screw stems furnished with a loose head or fitting and an ordinary spring and screw-nut.

A clear illustration of my invention is given in the annexed drawings, in which:—

Figure 1, is a vertical cross-section of the glazing bar; Fig. 2 is a similar view showing the two portions of glass panes secured by the screw-stem; Fig. 3 is a corresponding plan.

The U-shaped rolled bars $a$ are formed with top flanges $b$ which are set so as to project inward and outward and thus form two adjacent longitudinal grooves $c$ and $d$. The grooves $c$ receive the packing cords $f$ upon which the glass panes $g$ rest. The glass panes are fastened by means of screws $h$ formed with large heads $i$ which are drawn against the inclined inner sides of the flanges $b$. The screws $h$ are furnished with curved springs $k$ which are pressed with their free ends against the glass panes by means of the nut $l$, while the said glass panes are pressed tightly upon the packing cords $f$.

As the glazing bars have no perforations, slots or openings there will be no fear of the water escaping into the roofed-in spaces. Moreover, the condensation water from the glass panes that may be produced in cold weather, drips into the external top grooves or gutters $d$, without fear of splashing as must be the case when such gutters are at the lower end of the channel bar.

The fixing screw shown in Fig. 1 has a slight disadvantage inasmuch as it may come loose by reason of the spring $k$ slackening, and thereby releasing the glass panes. When several of the fastening screws become unintentionally loosened in this manner, the glass panes are liable to be displaced by high winds or otherwise. To obviate this disadvantage, I prefer to use a fastening screw of the kind shown in Fig. 2. The screw stem $h^1$ has a loose head or fitting $i^1$ and reaches down to the bottom of the channel bar so that by appropriately turning the screw stem, its loose head $i^1$ will be forced upward against the inner flanges of the channel bar, both parts being formed with suitable inclines to insure the tightening and centering of such parts. Thus the slackening of the spring $k^1$ will not be followed by the loosening and displacing of the screw. Therefore, as the screw is independently fixed, the slackening of the spring $k^1$ will only slightly reduce the pressure of same on the glass panes while effectually preventing the latter from being blown away by the wind. A very strong wind could only slightly rattle the panes and just lift them against the springs $k^1$ which latter then react to keep the panes in position.

What I claim is:—

1. In a glazing bar, the combination with a U-shaped channel bar, of inner inclined flanges, a groove formed in such flanges and an external top gutter at each side of said bar, as set forth.

2. A channel bar having upper inclined flanges at the inner side, a groove in each flange, a packing cord in such groove, and an external top gutter at each side of said bar rolled in continuation of said inner flange, glass panes supported on said packing cords and means for securing said glass panes, as set forth.

3. A glazing bar of channel section, upper inner inclined flanges, a longitudinal groove in each flange, external top gutters connected with said flanges, packing cords placed in said grooves, glass panes supported on said packing cords, a screw stem centrally disposed in the glazing bar, a loose screw head fitted internally against the inclined flanges, a curved spring fitted over the screw stem externally of the glass panes, and a screw nut to secure said spring, as set forth and for the purpose described.

FRANZ WESSELS, JR.

Witnesses:
WM. VAUDER,
R. H. DUNLAP.